United States Patent
Franke et al.

(10) Patent No.: US 7,280,565 B2
(45) Date of Patent: Oct. 9, 2007

(54) SYNCHRONOUS CLOCKED COMMUNICATION SYSTEM WITH DECENTRALIZED INPUT/OUTPUT MODULES AND METHOD FOR LINKING DECENTRALIZED INPUT/OUTPUT MODULES INTO SUCH A SYSTEM

(75) Inventors: Michael Franke, Erlangen (DE); Steffen Hellmich, Chemnitz (DE); Martin Kiesel, Poxdorf (DE); Guido Seeger, Baiersdorf (DE); Bernhard Weissbach, Frankenberg (DE)

(73) Assignee: Siemens Aktiengesellschaft, Munich (DE)

( * ) Notice: Subject to any disclaimer, the term of this patent is extended or adjusted under 35 U.S.C. 154(b) by 955 days.

(21) Appl. No.: 09/950,171

(22) Filed: Feb. 12, 2002

(65) Prior Publication Data

US 2002/0131454 A1    Sep. 19, 2002

(30) Foreign Application Priority Data

Mar. 16, 2001   (DE) ................................ 101 13 261

(51) Int. Cl.
*H04J 3/00* (2006.01)
(52) U.S. Cl. .................. 370/530; 710/110; 709/348
(58) Field of Classification Search ............. None
See application file for complete search history.

(56) References Cited

U.S. PATENT DOCUMENTS

| 5,341,372 | A | * | 8/1994 | Kirkham | 370/400 |
| 5,497,374 | A |   | 3/1996 | Maruyama et al. | 370/85.4 |
| 5,566,180 | A |   | 10/1996 | Eidson et al. | 370/94.2 |
| 5,621,725 | A | * | 4/1997 | Kawamura et al. | 370/300 |
| 5,661,700 | A | * | 8/1997 | Weppler | 368/46 |
| 5,887,029 | A |   | 3/1999 | Husted et al. | 375/224 |
| 5,974,056 | A |   | 10/1999 | Wilson et al. | 370/509 |
| 6,148,051 | A | * | 11/2000 | Fujimori et al. | 375/356 |

(Continued)

FOREIGN PATENT DOCUMENTS

DE    19633745    2/1998

(Continued)

OTHER PUBLICATIONS

IEEE Standard 1394-1995: IEEE Standard for a High Performance Serial Bus, 1995, pp. i, 1, & 331.*

(Continued)

*Primary Examiner*—Chau Nguyen
*Assistant Examiner*—Jung Park
(74) *Attorney, Agent, or Firm*—Baker Botts L.L.P.

(57) ABSTRACT

The invention relates to a synchronous clocked communication system, for example a distributed automation system, the stations of which can be arbitrary automation components and which are coupled to one another via a data network. Using the disclosed method for integrating decentralized input/output modules, these decentralized input/output modules can be linked into the synchronous clocked communication system in such a manner that they can use their characteristics unrestrictedly. Thus, in particular, the detection of input signals and the output of output signals is possible in a deterministic and synchronous manner in the decentralized input/output modules. In addition, the disclosed method enables input signals to be detected with an accuracy of less than the length of one communication cycle of the communication system and to support the switching of output signals in smaller time granularities than the length of one communication cycle which, in particular, finds use, e.g. for switching cams.

43 Claims, 3 Drawing Sheets

U.S. PATENT DOCUMENTS

| | | | |
|---|---|---|---|
| 6,539,489 B1* | 3/2003 | Reinert | 713/400 |
| 6,594,239 B1* | 7/2003 | Matsumaru et al. | 370/257 |
| 6,804,205 B1* | 10/2004 | Nishimura et al. | 370/296 |
| 2002/0064157 A1* | 5/2002 | Krause | 370/393 |
| 2002/0129290 A1* | 9/2002 | Couillard | 713/400 |

FOREIGN PATENT DOCUMENTS

| | | |
|---|---|---|
| DE | 19702379 | 8/1999 |
| DE | 19626287 | 11/1999 |
| DE | 10110675 | 9/2002 |
| DE | 10113261 | 9/2002 |
| EP | 0560226 | 9/1993 |
| EP | 0903655 | 3/1998 |
| WO | 0031932 | 6/2000 |
| WO | 02075509 | 3/2002 |

OTHER PUBLICATIONS

"Initial Synchronization of TDMA Communication in Distributed Real-Time Systems" by Henrik Lonn, *IEEE Computer Soc*, May 31, 1999, pp. 370-379.

Digital Interface for Communication Between Controls and Drivers in Numerically Controlled Machines,; *Sercos Interface*, Jan. 1995, pp. 3-127-22-127.

* cited by examiner

SYNCHRONOUS CLOCKED COMMUNICATION SYSTEM WITH DECENTRALIZED INPUT/OUTPUT MODULES AND METHOD FOR LINKING DECENTRALIZED INPUT/OUTPUT MODULES INTO SUCH A SYSTEM

CROSS REFERENCE TO RELATED APPLICATION

This application claims priority to German application number 10113261.1 filed Mar. 16, 2001.

FIELD OF THE INVENTION

The invention relates to a synchronous, clocked communication system with decentralized input/output modules and a method for linking decentralized input/output modules into such a system.

BACKGROUND OF THE INVENTION

A synchronous, clocked communication system having characteristics of equidistance is understood to be a system of at least two stations which are connected to one another via a data network for the purpose of the mutual exchange of data or, the mutual transmission of data. In this arrangement, the data exchange is cyclic in equidistant communication cycles which are predetermined by the communication clock used by the system. Stations are, for example: centralized programmable controllers, programming, configuration or operating devices, peripheral devices such as e.g. input/output modules, drives, actuators, sensors, stored-program controllers (SPS) or other control units, computers or machines which exchange electronic data with other machines, particularly those which process data of other machines. In the text which follows, the control units are understood to be closed-loop or open-loop control units of any type. The data networks used are, for example, bus systems such as, e.g. field bus, process field bus, Ethernet, industrial Ethernet, FireWire or also internal PC bus systems (PCI) etc.

In distributed automation systems, for example in the field of drive engineering, clocked data networks or bus systems are often used. Some of the connected stations are used as master devices, e.g. control units such as numeric or stored-program controllers or configuration devices, and other stations are used as slave devices such as drives or peripheral devices. Automation components of both categories can operate in a clocked manner, i.e., these stations can synchronize to a communication clock used in the data network. This means that the communication clock can be taken over by the stations via the data network used and certain processes can be controlled in synchronism with this communication clock. According to IEC 61491, EN61491 SERCOS interface—Technische Kurzbeschreibung (basic technical description) (http://www.sercos.de/deutsch/doku_freier_bereich.htm), this is currently used and carried out in distributed automation systems. In contrast, decentralized input/output modules such as, e.g. I/O modules which, as interfaces, for example between the data network and devices to be controlled or a process to be controlled, bidirectionally ensure the exchange of signals and/or data between the devices or processes to be controlled and other stations of the communication system such as, e.g. control units, by means of the data network, currently cannot operate in a clocked manner, i.e. they cannot synchronize to a communication clock of the communication system. As a result, it is not possible to switch inputs and outputs of the decentralized input/output modules at a fixed predetermined time and, on the other hand, it is also not possible to specify the switching of outputs with sufficiently great timing accuracy. As a result, the events of signal detection at a device or process to be controlled and data output to the device or a process to be controlled cannot be deterministically linked to one another and the time interval between signal detection and data output depends on the dead times within the communication system, especially within the decentralized input/output modules. In the text which follows, the term device to be controlled also means a process to be controlled, especially an automation process and/or subprocess of an automation process.

SUMMARY OF THE INVENTION

It is the object of the present invention to provide a synchronous, clocked communication system with characteristics of equidistance and at least one decentralized input/output module and a method for linking one or more decentralized input/output modules into a synchronous clocked communication system, in which the characteristics of such a communication network are widened to and used by the decentralized input/output modules. This object is achieved by a method for linking one or more decentralized input/output modules into a synchronous clocked communication system wherein at least one decentralized input/output module synchronizes to the communication clock of the communication system.

The present invention is based on the finding that when a clocked bus system or data network is used in distributed automation systems, the beginning of each new communication cycle is indicated to all stations of the communication system, for example by transmitting a special data packet, e.g. a so-called global control data packet. Apart from this method, there are also other methods which provide for clock synchronization between the stations which, naturally, can also be used in conjunction with the present invention disclosed herein. Together with the information on the length of a communication clock cycle which is determined at least during start-up of the system and is distributed to all stations, all stations can be synchronized to the clock used. This information is transmitted to all stations of the communication system by a distinguished master station, the so-called timing generator. By evaluating precisely this information, the decentralized input/output modules can also synchronize to the communication clock used in the data network and thus apply and use the characteristics of the synchronous clocked communication system.

One Preferred embodiment of the invention is characterized by the fact that the signals of a device to be controlled which are present at the input of a decentralized input/output module to the device are detected synchronously with respect to the communication clock of the communication system by the decentralized input/output module, converted into a data format compatible with the data network, and forwarded synchronously to a control unit via the data network for processing. This makes it possible to ensure that when an event occurs at the device to be controlled, for example actual-value detection, the signals or data produced are detected by the decentralized input/output module synchronously to the clock of the communications system, converted into a compatible data format and forwarded at the clock rate of the communication system via the data network to the control unit to be processed there.

Another preferred embodiment of the invention is characterized by the fact that data transmitted synchronously to the decentralized input/output module from the control unit via the data network, are converted in the input/output module into signals which can be interpreted for the device to be controlled and are switched at the output of the decentralized input/output module synchronously with respect to the communication clock of the communication system and are forwarded to the device. Thus, data (for example nominal values which have been correspondingly calculated by the control unit on the basis of previously received actual values of a device to be controlled) can be sent to the decentralized input/output module via the data network at the clock rate of the communication system, converted by the input/output module into signals which can be interpreted for the device to be controlled, for example nominal position values, and switched at the output of the decentralized input/output module synchronously to the clock of the communication system and transmitted to the device to be controlled as a result of which the predictability and timing accuracy of the switching process itself and of the signal determination is eminently improved.

Another preferred embodiment of the invention is characterized by the fact that the time for the registration and detection of signals of a device to be controlled can be adjusted at the input of the decentralized input/output module with respect to the communication clock of the communication system or a clock derived therefrom. Similarly the time for the switching and forwarding of the signals at the output of the decentralized input/output module to the device to be controlled can be adjusted with reference to the communication clock of the communication system or a clock derived therefrom. The advantage of this embodiment is that the detection and registration of an event at the device to be controlled (for example an actual-value detection) can be carried out not only at the clock rate of the communication system but also the time within a communication clock cycle can be specified at which the registration or detection is to take place, e.g. immediately before the end of the current communication clock cycle or at another desired time within a communication clock cycle. This analogously applies to the switching and forwarding of signals, for example of nominal values at the output of the decentralized input/output module to the device to be controlled in the case of which the time for the output within a communication clock cycle can also be specified, for example immediately after the beginning of a communication clock cycle. The detection of input and switching of output events by means of decentralized input/output module thus becomes plannable and predictable because both events are placed into a deterministic relationship, and the timing accuracy during the detection of signals and in the switching of outputs of a decentralized input/output module is additionally increased. Moreover, detection is carried out at least once in each communication cycle and always precisely at the same time relative to the beginning or, respectively, end of the respective communication cycle.

Another preferred embodiment of the invention is characterized by the fact that the registration and detection of signals at the input of the decentralized input/output module of at least two devices to be controlled which are in each case connected to a different decentralized input/output module is synchronized in such a manner that the registration and detection takes place at the same time with reference to the communication clock cycle of the communication system at the respective input/output modules. Similarly the output of signals at the output of the decentralized input/output module to at least two devices to be controlled which are in each case connected to a different decentralized input/output module is synchronized in such a manner that the output takes place at the same time with reference to the communication clock cycle of the communication system at the respective decentralized input/output modules. The advantage of this embodiment is that the registration and detection of signals of a device to be controlled, and the output of signals to the device to be controlled, can be placed into a deterministic relationship in each case with reference to a single input/output module. This means that both registration and detection of signals can always take place at the same time within a communication clock cycle and the output of associated response signals can also always take place at the same time within a subsequent, especially the immediately following communication clock cycle, so that the space between registration and detection and output exhibits a predeterminable space in time. In addition, this behavior can be expanded to at least two or more decentralized input/output modules. This means that, within a communication clock cycle of the communication system, at least two or more decentralized input/output modules and/or also drives can be caused to register and detect signals and, respectively, to output signals to different devices to be controlled, synchronously, i.e. simultaneously within the communication clock cycle considered. This is of advantage especially if the devices to be controlled, for example drives, are devices which collaborate in interpolatory interconnection and, therefore, must have the same understanding of, for example, position information at machines, especially if this concerns the control of shafts. This analogously applies to the output of signals, for example nominal values, to the devices to be controlled.

Another preferred embodiment of the invention is characterized by the fact that the registration and detection of signals at the input of at least one decentralized input/output module, and at least one other automation component, especially a drive, is synchronized in such a manner that the registration and detection take place at the same time with reference to the communication clock cycle of the communication system, at the decentralized input/output module and the automation component. Similarly, the output of signals at the output of at least one decentralized input/output module and of at least one other automation component, especially a drive, is synchronized in such a manner that the signal output takes place at the same time with reference to the communication clock cycle of the communication system, at the decentralized input/output module and the automation component. The advantage here is that, within a communication clock cycle of the communication system, one or more decentralized input/output modules and/or one or more other automation components, especially drives, can be caused to register and detect signals and, respectively, output signals to different devices to be controlled, synchronously, i.e. simultaneously within the communication clock cycle considered. This is of advantage especially if the devices to be controlled are devices which collaborate in interpolatory interconnection and, therefore, must have the same understanding of, for example, position information at machines, especially if this relates to the control of shafts. This analogously applies to the output of signals, for example nominal values, to the devices to be controlled.

Another preferred embodiment of the invention is characterized by the fact that for each device to be controlled, signals are detected at least once by the associated decentralized input/output modules, converted into a data format compatible with the data network, and forwarded synchronously with reference to the communication clock cycle of the communication system via the data network to the control unit for processing within one communication cycle of the communication system. The advantage here is that the control unit has the possibility of comparing actual values with certain nominal values and, if necessary to intervene in a correcting manner at least once in each communication cycle.

Another preferred embodiment of the invention is characterized by the fact that the respective detection of signals at a device to be controlled takes place at such a time within a communication cycle of the communication system that a conversion of the signals into a data format compatible with the data network and a forwarding of the data to the control unit via the data network for processing is effected by the decentralized input/output module in the immediately following communication cycle, and a conversion of the response data of the control unit in the decentralized input/output module into signals (which can be interpreted for the device to be controlled, and their output to the device to be controlled) is effected in the next-but-one communication cycle so that the interval between signal detection at the device to be controlled and output of the response signal to the device to be controlled is, at the most, two communication cycles of the communication system. The advantage here is the possibility of being able to switch very rapidly and with optimum timing, i.e. optimizing the speed of response between detection of an event by a decentralized input/output module, for example actual-value detection at the device to be controlled, processing logic in the control unit and switching of the outputs of the corresponding decentralized input/output module including the transmission of the corresponding response signals to the device to be controlled, for example nominal values.

Another preferred embodiment of the invention is characterized by the fact that the decentralized input/output module provides characteristic data which can be called up and evaluated via the data network by at least one control unit. The characteristic data captures the maximum possible accuracy and the minimum possible time in the temporal detection of signals from a device to be controlled. It is also advantageous if the decentralized input/output module provides characteristic data which can be called up and evaluated by at least one control unit via the data network, again with the characteristic data comprising the maximum possible accuracy and the minimum possible time in the temporal output of signals to a device to be controlled. The advantage here is given by the fact that the decentralized input/output module can inform, e.g. a control unit, about the maximum accuracy with which a signal detection, for example actual-value detection, is possible by means of this decentralized input/output module at the device to be controlled, and at which minimum possible time this is possible so that these signals or data can still be forwarded to the control unit, for example in the next communication cycle. This makes it possible for the control unit to include and correspondingly optimize this knowledge of the characteristic data of the decentralized input/output modules into the closed-loop or open-loop control of the automation system. This analogously applies to the output of signals, for example nominal values to the devices to be controlled by means of the decentralized input/output modules. In addition, these characteristic data can, naturally, be read out, for example as device descriptions, both on-line during active operation from the corresponding station or stations, especially the automation component or components, and provided off-line as description information of the respective automation components as a result of which the range of available characteristics, and thus the possible range of application is precisely documented.

Another preferred embodiment of the invention is characterized by the fact that at least one station of the communication system has a counter and the number of communication cycles is continuously counted by the station with the counter by means of one counter in active operation beginning from the system start-up beginning at zero or an arbitrary offset, and in each case the counter is incremented by one with the beginning of a new communication cycle. The current state of the counter characterizes the current communication cycle. An arbitrary communication cycle can be derived and/or calculated from a number, especially a count. The communication cycle itself is represented by a digitized number or an absolute time unit which is derived from the duration of a communication cycle. As a result, a time stamp can be generated from a communication cycle which is represented as a digitized number or in an absolute time unit which is derived from the duration of a communication cycle, and/or from a time value within a communication cycle. The advantage here is that during the operation of the system a station permanently has the capability of determining the current communication cycle which creates the prerequisite for all stations to be able to receive this information when the corresponding station distributes this information via the data network used. This creates the prerequisite for events within the communication system to be controllable in such a manner that they can be carried out isochronously. Naturally, this applies to all stations of the communication system. Another advantage is given by the fact that the associated communication cycle can be derived from a count. This makes it possible to represent a communication cycle both as a digitized number, for example direct use of the count, or as an absolute time unit which can be calculated from the duration of a communication cycle as a result of which a form of representation can be selected which is optimum for the respective situation.

Another preferred embodiment of the invention is characterized by the fact that the aforesaid time stamp consists of two parts. One part determines the communication cycle of the communication system in which the signals of a device to be controlled are registered and detected at the input of a decentralized input/output module, or signals are to be switched at the output of a decentralized input/output module and to be output to the device to be controlled. The other part determines the time relative to the start or to the end of the respective relevant communication cycle of the communication system. The advantage here is a further refinement of the scaling for the accuracy in the detection and registration of signals of a device to be controlled and, respectively, in the output of signals to the device to be controlled. This makes it possible not only to determine or arrange signals in the pattern of a number of communication cycles, or absolute time unit derived therefrom, but it is also to determine the time within the relevant communication cycle with the utmost accuracy and to optimize the event control accordingly.

Another preferred embodiment of the invention is characterized by the fact that the respective current count and/or current communication cycle and/or current time stamp is distributed by the station with the counter to at least one further station of the communication system by means of the data network. Similarly, the respective current count is distributed by the station with the counter to at least one further station of the communication system by means of data network, and the current communication cycle and/or current time stamp is transmitted from the transmitted current count by the respective stations themselves. This makes it possible to inform certain decentralized input/output modules, as well as all stations, of a communication system having the characteristics described of the corresponding information on the basis of which an isochronous data exchange or the control of events or event sequences within the communication system between the stations can be considerably improved or even made possible.

Another preferred embodiment of the invention is characterized by the fact that signals of a device to be controlled, when they are registered and detected at the input of a decentralized input/output module, are converted by the input/output module provided with the time stamp which is current at this time and the detection switching event, into a data format compatible with the data network, forwarded with the time stamp and the switching event via the data network to the control unit, where they are evaluated and processed. As a result, the detection time of signals of a device to be controlled can be determined with extraordinary precision and stored and is thus available at any time for calculating dependent events.

Another preferred embodiment of the invention is characterized by the fact that data which are intended for the device to be controlled, before they are transmitted to the decentralized input/output module, are provided with a time stamp referenced to the time of the planned signal output and with an output switching event by the control unit. The data are transmitted with this time stamp and the switching event via the data network to the decentralized input/output module and the data are converted by the decentralized input/output module into signals which can be interpreted for the device to be controlled and are switched in accordance with the switching event at the output of the decentralized input/output module at the time which is predetermined by the transmitted time stamp and are output to the device to be controlled. This embodiment provides a particular advantage due to the fact that the switching of an output event at the output of the decentralized input/output module can be planned precisely based on the time of the registration of an entry event at the input of a decentralized input/output module, and can be performed with an extraordinary time precision which is extraordinarily advantageous in the field of drive engineering in distributed automation systems, for example in wood processing machines or for the switching of cams etc. The time interval between input event and output event can thus be adjusted and achieved individually with the same high timing precision in each case for any arbitrary situation in the field of application described, as a result of which the dependence on dead times by affected stations of the communication system is very greatly reduced.

The embodiment disclosed herein above can be applied to or used in packaging machines, presses, injection molding machines, textile machines, printing machines, machine tools, robots, handling systems, wood processing machines, glass processing machines, ceramic processing machines and lifting tools.

BRIEF DESCRIPTION OF THE DRAWINGS

In the text which follows, the invention will be described and explained in greater detail with reference to the exemplary embodiments shown in the figures, in which.

DETAILED DESCRIPTION OF THE INVENTION

Figure 1:
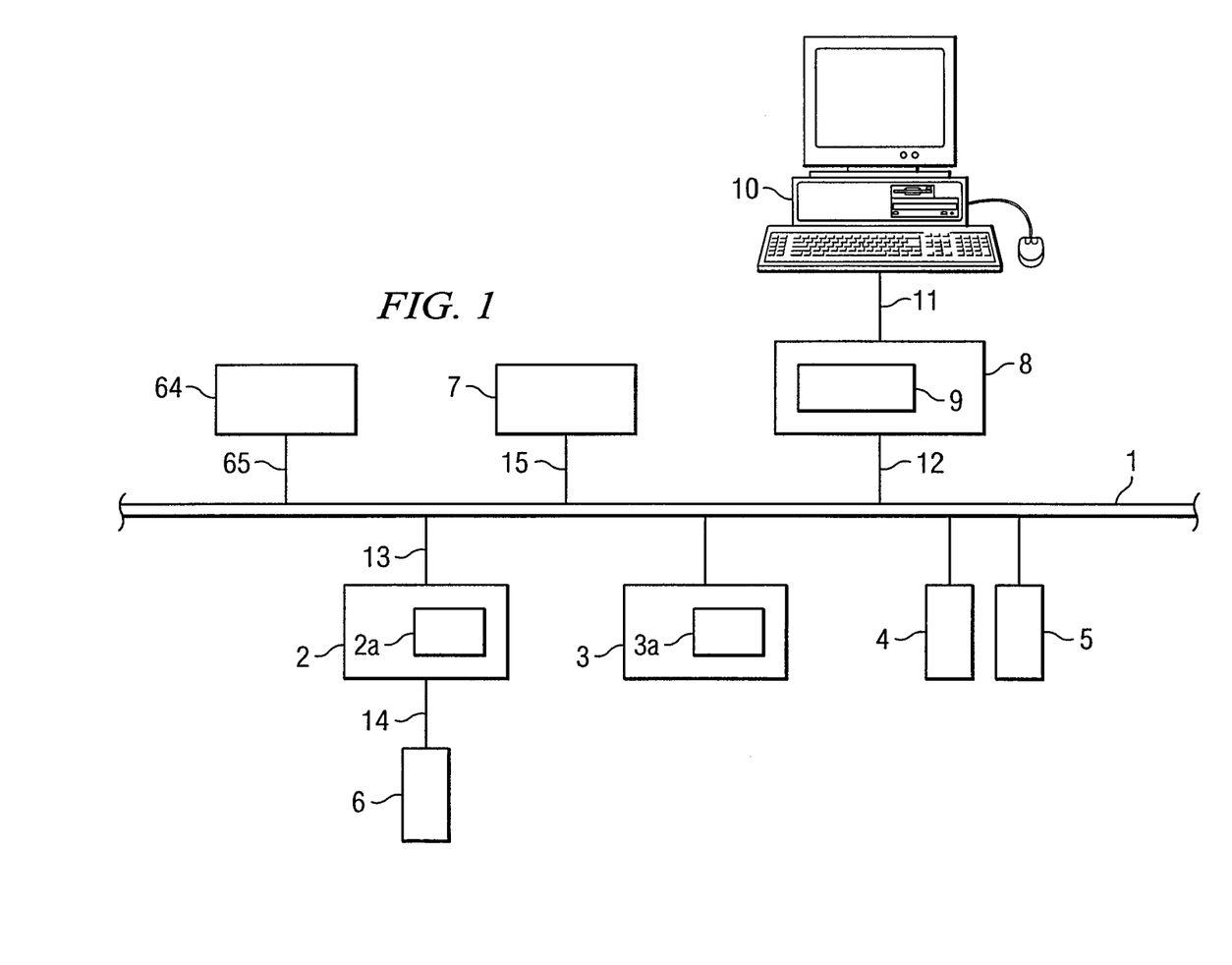
FIG. 1 shows a diagrammatic representation of an exemplary embodiment of a synchronous clocked communication system.

FIG. 1 shows a diagrammatic representation of an exemplary embodiment of a synchronous, clocked communication system. The communication system shown is, at the same time a distributed automation system. In the text which follows, these two terms will be used synonymously. The exemplary embodiment shown consists of a number of stations which can be formed both as transmitter and as receiver, at the same time, and thus can transmit and receive both signals or data. All stations are connected directly or indirectly to the data network 1, not only by for example a bus system with and/or without real-time characteristics such as clock synchronization and equidistance such as, e.g. Ethernet, industrial Ethernet, field bus, professional field bus, FireWire or also internal PC bus systems (PCI) etc., but also by clocked data networks such as, for example, isochronous real-time Ethernet, via data lines. Only data lines 11, 12, 13, 14 and 15 have been shown for reasons of simplicity of representation. The data lines are formed depending on their intended use, in such a manner that they can transmit or conduct both data and signals or other electrical pulses. In particular, data lines of various types can be used in this distributed automation system which in each case can transmit data in different data formats. Thus, data can be sent in a different format via the data line 14 than, for example, via the data line 13. In this case, for example, the decentralized input/output module 2 takes care of the appropriate conversion. Naturally, it is also possible for the data lines 13 and 14 to transmit data in the same format. In this case, genuine data conversion by the decentralized input/output module 2 is not necessary, but the data are forwarded in unchanged form which corresponds to a so-called switching-through of the data. The possibility for the decentralized input/output module 2 to treat and/or process the data in any manner, especially to add a time stamp to the data without changing the data format itself and/or converting it into another format (if necessary for the proper functioning of the automation system) is unaffected. Data lines connected directly to the data network 1, for example data lines 12, 13 and 15, in principle transmit data in the same data format as the data network 1 itself. The data network 1 used operates in a clocked manner and data are exchanged synchronously at the communication clock rate used via the data network 1. Initial synchronization of all connected stations to the clock used occurs, for example, during system start-up. To ensure a clocked data exchange, these stations are continuously resynchronized during the active operation. Naturally, it is also possible additionally for stations which are connected to the data network 1 during active operation to be able to synchronize to the communication clock used. The possibility of being able to adjust the communication clock used at least once during system start-up depending on requirement and/or application is particularly advantageous. In this exemplary embodiment, devices to be controlled are shown as stations, for example drives 4, 5 and 6, decentralized input/output modules 2 and 3, a configuration device 7, a control unit 8 (equipped with a counter 9) and an operating device 10 (formed, as a computer with keyboard and mouse). Naturally, all types of different automation components or devices are also conceivable as stations. The number and/or location of the relevant stations are shown only by way of example. The decentralized input/output modules 2 and 3 shown, exhibit at least characteristic data about their maximum possible accuracy and the minimum possible time in the detection of signals of devices to be controlled, and in the output in time of signals to the devices to be controlled, e.g. drive 6, in retrievable form, for example in internal memories 2a and 3a.

FIG. 1 also depicts a clock generation means 64 coupled to data network 1 which is operable to create a communication clock 65 for the system. Although clock generation means 64 is depicted as a component independent of all other elements depicted in FIG. 1, it is understood that clock generation means 64 may be disposed in any other elements depicted in FIG. 1, including, without limitation, control unit 8.

In the embodiment shown in FIG. 1, an event can be performed at a device to be controlled, for example an actual-value detection at the analogue drive 6 via a sensor and/or actuator integrated into this drive and not shown for reasons of simplicity. These actual values can be transmitted by means of the data line 14 to the decentralized input/output module 2 where they are synchronously in clock-controlled synchronism detected and converted into a corresponding data format compatible with the data network 1. The data converted in this manner are then forwarded synchronously at the communication clock used in the communication system, via data line 13, data network 1, for example an Ethernet bus system, and data line 12 to the control unit 8. The control unit 8 is formed as a stored-program control (SPS), or any other open-loop or closed-loop control unit which receive and evaluate data from all stations connected to the data network 1, and/or can send data to all stations. Thus, the control unit 8 processes the actual values of the drive 6 sent in clock-controlled synchronism by the decentralized input/output module 2; calculates corresponding nominal values on the basis of these actual values; and sends these nominal values, also in clock-controlled synchronism, via data line 12, data network 1 and data line 13 back to the decentralized input/output module 2. The latter converts the received nominal values into signals which can be interpreted for the drive 6 and forwards them synchronously at the communication clock used via data line 14 to drive 6 which interprets and converts the received nominal values, for example as control commands, by means of an integrated actuator, not shown for the sake of simplicity. This same mechanism can be analogously transferred to a process, again not shown for the sake of simplicity, is connected to the decentralized input/output module 3.

An operating device 10 can also be used to access the control unit 8 manually via the data line 11, and by this means influence the appropriate closed-loop and open-loop control mechanisms of the control unit 8. It is of particular advantage that, for example, a configuration device 7 connected to the data network 1, which also represents a control unit, can interrogate the characteristic data of the decentralized input/output modules 2 and 3, evaluate them, and, on the basis of these data, exert influence on the data exchange between the automation components connected to the data network 1 or can take these characteristic data into consideration for the planning and execution of configuration and/or control tasks. As a result, the distributed automation system can operate in a more time and cost optimum manner. The configuration device 7 and the control unit 8 are formed as master devices since they can exert direct influence on the control of the communication system and the other connected stations. Analogously, the other stations, (drives 4, 5 and 6, and the decentralized input/output modules 2 and 3) are called slave devices since they are correspondingly driven by the master devices. As can be clearly seen from FIG. 1, it is easily possible and also normal that automation components can be connected directly to the data network 1 without any interposed decentralized input/output module. The drives 4, 5 and 6 shown must also be considered as examples of any automation components, especially field devices, devices or machines to be controlled.

FIG. 1 also shows a control unit 8 having a counter 9. The counter 9 used is basically a modulo counter, the form of which can be selected arbitrarily (16-bit counter, 32-bit counter etc.) depending on the desired magnitude to be represented or counter range. Using this counter 9, which can be implemented in hardware or software as a standard model, the number of communication cycles can be continuously counted in parallel during the active operation from the system start-up, beginning at zero or any arbitrary offset. This means that the count of the counter 9 is incremented by one unit with the beginning of each a new communication cycle, as a result of which, the respective current state of the counter 9 also characterizes the respective current communication cycle. The triggering event for incrementing the count is, e.g. the evaluation of a special data packet (a so-called global control data packet) which is sent immediately at the beginning of the next communication cycle. If the counter 9 is located at the timing generator itself, for example at the control unit 8, the counter 9 is incremented immediately with or on sending this special data packet and the current count is sent to the remaining stations, for example, together with this data packet. Naturally, however, it is also possible for the counter 9 to be located at one or more other stations. In this case, the counter 9 is incremented by the corresponding stations at or immediately after reception of this data packet. Since the count is unambiguously correlated with a particular communication cycle in this manner, it is also possible for any communication cycle to be derived and/or calculated from a number, particularly a count, as a result of which the associated communication cycle can be unambiguously determined on the basis of a current count and thus the current communication cycle from a count reached in the future or in the past. If, for example, the output of the decentralized input/output module 2 is to be switched in a particular communication cycle, this event is triggered correspondingly by the decentralized input/output module 2 when the corresponding count is reached. This increases the predictability and the accuracy in time of the detection and, respectively, the triggering of events.

The communication cycles can be represented as a digitized number, or as an absolute time unit which is derived from the duration of a communication cycle, for example as multiples of 1 ms. This information can be distributed by a station with the counter 9, for example the control unit 8, to one or more or even all stations of the communication system via the data network 1 so that an unambiguous correlation with a particular communication cycle, namely the current communication cycle, is possible at any time for the corresponding stations. This makes it possible to prevent and detect faulty behavior of individual automation components due to time displacement effects, dead times, jitter etc., which, for example, cause an unwanted displacement of an event into another communication cycle.

Figure 2:
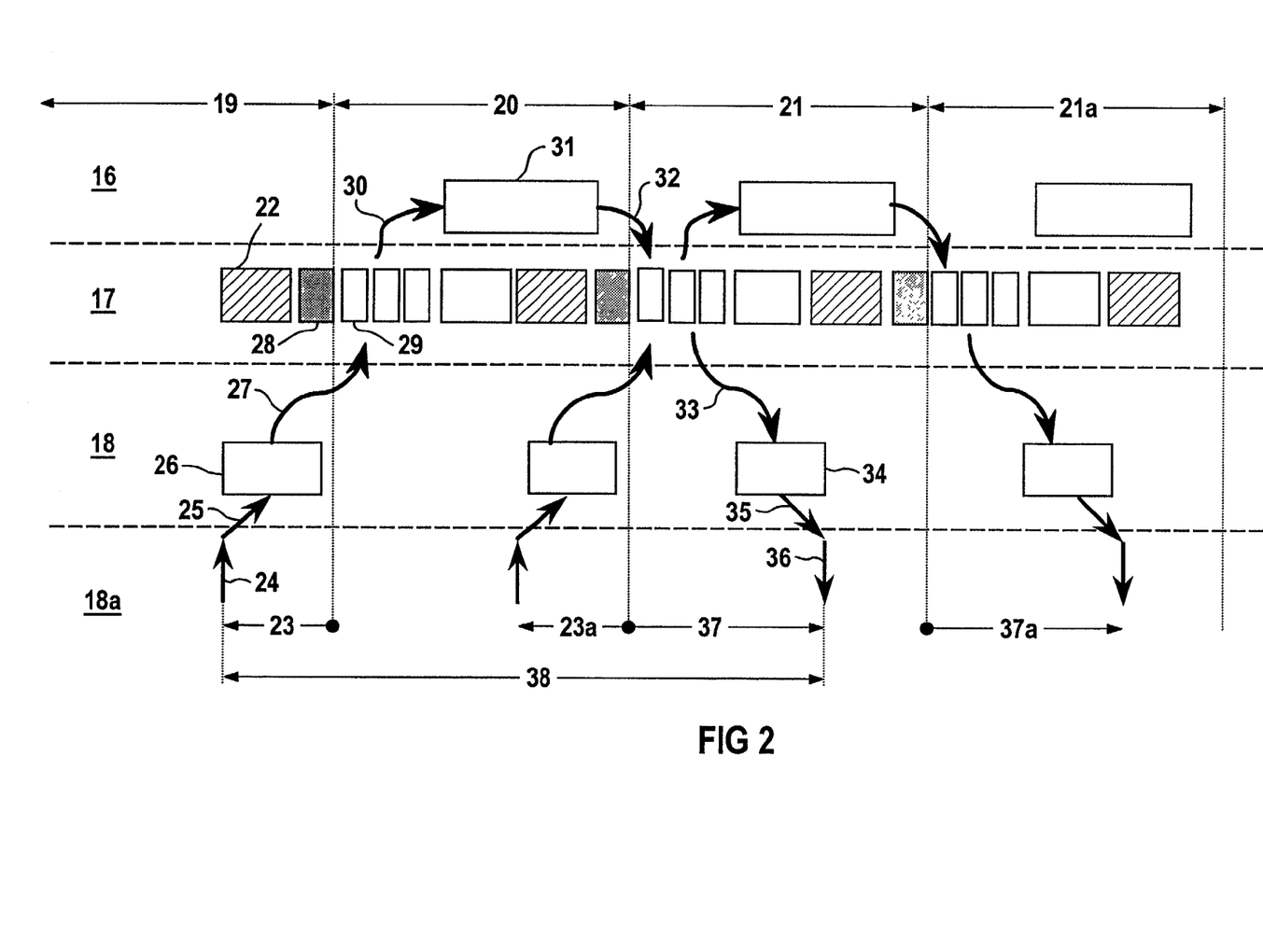
FIG. 2 shows the basic operation in a synchronous clocked communication system in the field of distributed automation systems.

FIG. 2 shows the basic operation in a synchronous clocked communication system in the field of distributed automation systems. Four successive communication cycles are illustrated: communication cycle n (19), communication cycle n+1 (20), communication cycle n+2 (21) and communication cycle n+3 (21*a*). Furthermore, the basic operation between occurrence of an input event 24 and the corresponding output event 36 is subdivided into four levels, namely into a control unit level 16, a data network level 17, an automation component level 18 and a process interface level 18*a*. All stations belonging to control unit level 16 are called master devices, such as, e.g. control unit 8; whereas the automation component level 18 includes automation components such as, for example, the decentralized input/output modules 2, 3, the digital drives 4, 5, 6 or other field and/or peripheral devices. The data network level 17 characterizes the connection between the two said levels 16 and 18 by means of the data network 1 and the process interface level 18*a* characterizes the reach-through of the automation components located at the level 18 to the underlying processes and/or process components. Thus, the input event 24 is, for example, the detection of actual transducer values in the case of drives, the detection, e.g. of actual values of the downstream-connected sensors in the case of decentralized input/output modules. The output event 36 is, e.g. the nominal-value output to the corresponding connected power sections in the case of drives, the nominal-value output to the corresponding connected actuators in the case of the decentralized input/output modules.

The operation shown in FIG. 2 characterizes the settled state, i.e. the decentralized input/output modules 2, 3 are already synchronized to the communication clock of the data network 1, i.e. the communication clock used and thus the length of a communication cycle are known at the automation component level 18, for example the decentralized input/output modules 2, since this was defined on system start-up and reported to all connected stations via the data network 1. The communication clock is adjustable, is set at least once during system start-up and then remains constant until it is possibly set again. The advantage of adjustability is that the communication clock cycle used, and thus the length of a communication cycle, can be varied depending on application and can thus be adapted to the different frame conditions.

The stations are synchronized to the communication clock used by means of the global control data packet 28 which in each case directly indicates the start of the next communication cycle and, therefore, is sent to all stations. This data packet 28 is evaluated by the stations during system start-up as a result of which the stations can synchronize to the communication clock of the communications system. To prevent overlap in the data transmission from one communication cycle to the next and ensure precise evaluation of the data packet 28 (and thus the definite signaling of the respective beginning of the communication cycle immediately following) no data are sent for a discrete time immediately before sending the global control data packet 28. This is called active waiting, indicated by the reserve 22. The reserve 22 is designated only once for the sake of simplicity. During active operation, the global control data packet 28, naturally, always immediately indicates the start of the next communication cycle. It is particularly advantageous that in the form shown, the decentralized input/output modules 2, 3, can evaluate the global control data packet 28 and thus also synchronize to the communication clock used.

As a result, the decentralized input/output modules 2, 3 can work isochronously like the other stations. This results in a distinct increase in time accuracy both in the detection of input events and in the switching of outputs, particularly of the decentralized input/output modules.

The length of a communication cycle, and thus, in particular, the length of the communication cycles n (19), n+1 (20), n+2 (21) and n+3 (21*a*), is thus known to the individual stations, particularly to the decentralized input/output modules 2, 3. Furthermore, the global control data packet 28 also specifies the beginning of a communication cycle and thus the beginning of communication cycle n+1 (20) is also known to the individual stations, particularly the decentralized input/output modules 2, 3. This also makes it possible to specify precisely the time interval 23 between input event 24, for example clocked actual-value detection and start of communication cycle n+1 (20), and thus for every communication cycle. It is particularly advantageous that this time interval 23 is adjustable and can be optimally specified depending on the application, for example, by the decentralized input/output module 2. Since each communication cycle has the same length, an input event 24 can always be detected by the decentralized input/output module 2 at the same time in each communication cycle, particularly in communication cycles n (19) and n+1 (20), i.e. the time interval 23 and 23*a* is thus exactly the same in communication cycles n (19) and n+1 (20), and thus in each communication cycle if no changes have been made by a station. In particular, this makes it possible to ensure that an actual-value detection is mandatorily performed once and always precisely at the same time relative to the start or end of the respective communication cycle in each communication cycle. Time interval 23 is not shown in communication cycles n+2 (21) and n+3 (21*a*) for reasons of simplicity of representation.

The operation disclosed in FIG. 2 (especially the detection of an input event 24) can take place not only at a decentralized input/output module 2 synchronously to the communication clock at the same time in each communication cycle, but can also be performed synchronously in parallel for a number of decentralized input/output modules 2, 3 in each communication cycle. Accordingly, the detection and registration of input events 24 by a number of decentralized input/output modules 2, 3 can be forced or performed in a planned manner always simultaneously with time interval 23, and synchronously to the communication clock. Here, too, other automation components, especially drives 4, 5, are conceivable instead of or together with the decentralized input/output modules 2, 3. In particular, this means that the registration and detection of input events 24 can also be synchronized between decentralized input/output modules 2, 3 and other automation components, especially drives 4, 5, in such a manner that they can always be forced or performed in a planned manner simultaneously with time interval 23 and synchronously to the communication clock. The time interval 23 is selected, for example, by the decentralized input/output module 2 in such a manner that the signal detection 25 at the automation component level 18 is performed, for example, at one time by the decentralized input/output module 2, that a signal conversion 26 still takes place in such a manner that the data forwarding 27 can be continued immediately when the next communication cycle n+1 (20) begins. The immediate start of the next communication cycle n+1 (20) is reported to all stations by the global control data packet 28. For reasons of simplicity, data packet 29, the global control data packet 28 marked grey, and the reserve 22 have in each case only been designated once at the data network level 17. The different lengths of the data packets does not have any special significance and only illustrates that the length of the individual data packets is content-dependent and thus variable. At the beginning of communication cycle n+1 (20), data forwarding 27 then takes place at data network level 17. The forwarded data packets are indicated at data packet 29. Within communication cycle n+1 (20), the data transmission 30 of the forwarded data takes place from the data network level 17 to the control unit level 16, for example to the corresponding control unit 8. In the control unit 8, the corresponding data processing 31 is then effected. During the data processing 31, the control unit 8 determines the corresponding response data, for example nominal values, from the transmitted data, for example actual values, and concludes these calculations in the same communication cycle n+1 (20) in such a manner that the control unit 8 can perform a data transfer 32 (for example calculated nominal values) from the control unit level 16 to the data network level 17 at the beginning of the next communication cycle n+2 (21). This data transfer 32 is also synchronous to the communication clock and can be performed in any communication cycle. From the data network level 17, data transmission 33 is still effected within communication cycle n+2 (21) to automation component level 18, for example to the decentralized input/output module 2, in such a manner that it can perform a corresponding data conversion 34 of the received data into signals which can be interpreted for the devices to be controlled, and the corresponding single output 35, in such a manner that a specifiable constant time interval 37 between the beginning of the current communication cycle n+2 (21) and the output event 36 is maintained. The output event 36 still takes place within communication cycle n+2 (21), the time interval 37 being adjustable and being optimally specified, for example, by the decentralized input/output module 2 depending on the application. The output event 36 can thus always be carried out in a clocked manner or at the same time in each communication cycle, especially in communication cycles n+2 (21) and n+3 (21a), i.e. the time interval 37 and 37a is thus exactly the same in communication cycles n+2 (21) and n+3 (21a), and thus in each communication cycle provided no changes have been made by a station. It is thus possible for the associated decentralized input/output modules to specify the time accuracy of the switching of the transmitted data, e.g. 35 with extraordinary precision. As a result, the time interval 38 between the input event 24 and output event 36 can thus be optimized in such a manner that it is two communication cycles apart at a maximum which is of great significance in many applications in distributed automation systems in the field of drive engineering. It is also particularly advantageous that the switching of an output event 36 can be performed synchronously to the communication clock at the same time in each communication cycle not only by one decentralized input/output module 2, but synchronously in parallel by a number of decentralized input/output modules 2, 3 in each communication cycle. Accordingly, the switching of output events 36 can be performed in a forced or planned manner always simultaneously with time interval 37, and synchronously to the communication clock by a number of decentralized input/output modules 2, 3. Other automation components, especially drives 4, 5, may also be used instead of or together with the decentralized input/output modules 2, 3. This means, in particular, that the switching of output events 36 can also be synchronized between decentralized input/output modules 2, 3 and other automation components, especially drives 4, 5, in such a manner that it can always be performed in a forced or planned manner simultaneously with time interval 37, and synchronously to the communication clock. This is of advantage, in particular, if the output events 36, for example nominal-value outputs, concern devices to be controlled which collaborate in interpolatory interconnection and, therefore, must have the same understanding of, for example, position information in the case of machines, particularly if this relates to the control of shafts. The time interval 37 and 37a have only been shown for communication cycles n+2 (21) and n+3 (21a) for reasons of simplicity.

Figure 3:
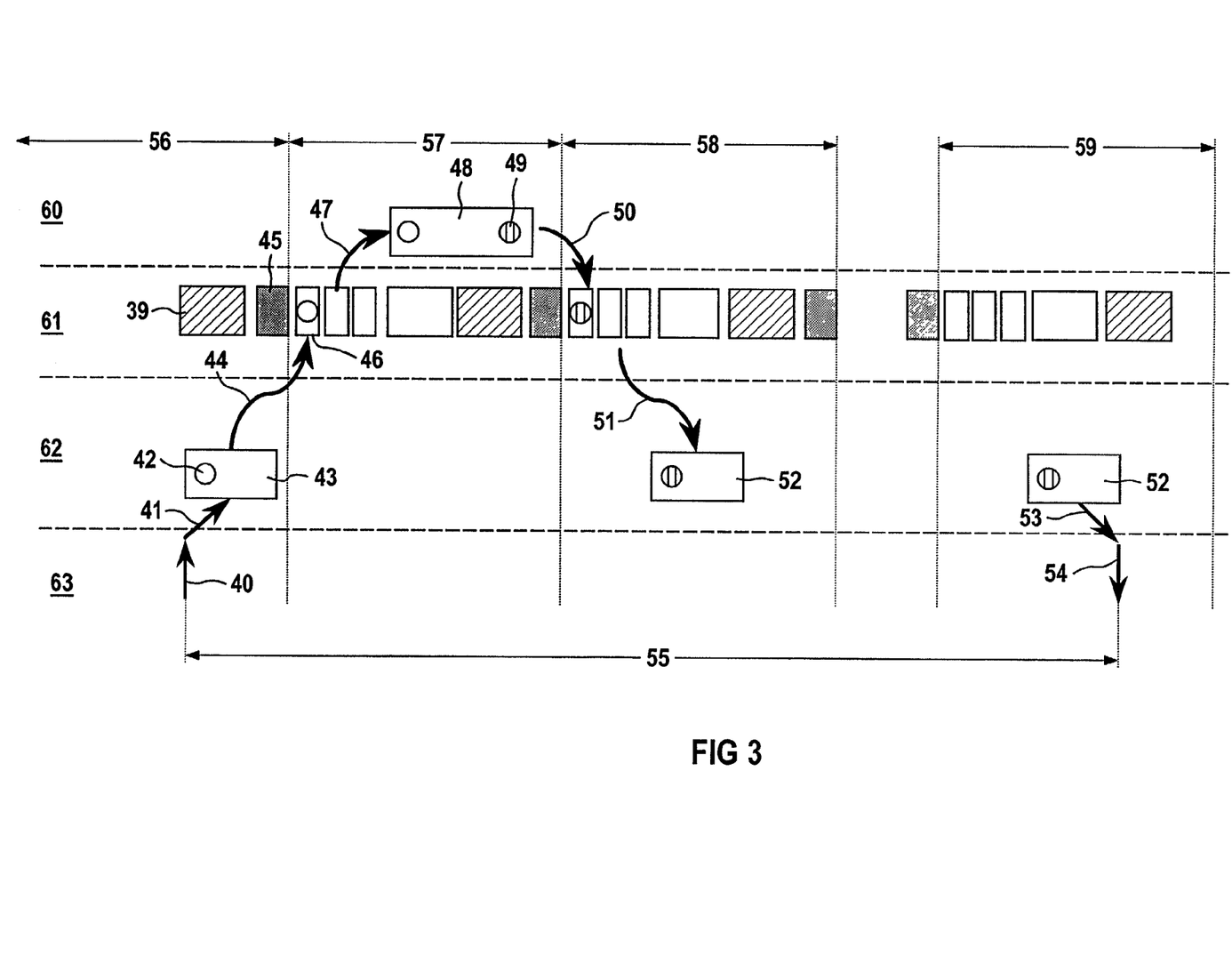
FIG. 3 shows the basic operation in a synchronous clocked communication system in the field of distributed automation systems, using a stamp.

FIG. 3 shows the basic operation in a synchronous clocked communication system in the field of distributed automation systems, using a stamp. To illustrate, for example, three successive communication cycles, communication cycle m (56), communication cycle m+1 (57) and communication cycle m+2 (58) and a further communication cycle m+x (59) occurring at a later time but not immediately following are shown. Furthermore, the basic operation between occurrence of an input event 40 and the corresponding output event 54 is subdivided into four levels, namely into a control unit level 60, a data network level 61, an automation component level 62 and a process interface level 63. All four levels symbolize the same levels which have also been used in FIG. 2. Analogously to FIG. 2, the operation shown in FIG. 3 also shows the settled state, i.e. all stations, especially the devices at the automation component level 62, for example the decentralized input/output modules 2 and 3, are already synchronized to the communication clock of the data network 1. The length of a communication cycle and thus, in particular, the length of communication cycles m (56), m+1 (57), m+2 (58) and m+x (59), is therefore known to the individual stations of the communication system, especially the decentralized input/output modules 2 and 3. Analogously to the mechanism described in FIG. 2, the beginning of a communication cycle is also specified by the global control data packet 45 and thus known to the stations of the communication system.

On the basis of the mechanism (disclosed in FIG. 1) which uses a counter for identifying the current communication cycle, the decentralized input/output modules 2, for example, can additionally generate a time stamp from a corresponding count or the corresponding communication cycle, which consists of two parts. One part characterizes the current communication cycle, for example communication cycle m (56), in which the decentralized input/output module 2 performs at its input the signal detection 41 of an input event 40 of a device to be controlled, and the other part defines the time of the signal detection 41 relative to the start or to the end within the current communication cycle, for example communication cycle m (56). This time stamp is added to the data, together with the type of input event, for example positive or negative switching edge etc., as stamp 42 at the automation component level 62, for example by the decentralized input/output module 2 during signal detection 41 of the input event 40 or signal conversion 43 so that the detection time and type of switching event of these data is precisely logged in the decentralized input/output module 2 and is a component of the data during the forwarding. The stamp 42 is illustrated only once for reasons of simplicity. The data forwarding 44 at data network level 61, indicated by the data packet 46, is then continued, for example at the beginning of the next communication cycle m+1 (57). The immediate start of the next communication cycle m+1 (57) is reported to all stations by transmission of the global control data packet 45. To prevent overlapping in the data transmission from one communication cycle to the next, and to ensure precise evaluation of the data packet 45 and thus the definite signaling of the respective beginning of the communication cycle immediately following, no data are sent for a discrete time immediately before sending the global control data packet 45 analogously to the description of FIG. 2. This is called active waiting, indicated by the reserve 39. The data packet 46, the global control data packet 45 marked grey, and the reserve 39 have in each case only been illustrated once at the data network level 61 for reasons of simplicity. The different lengths of the data packets designated have no particular significance and only illustrates that the length of the individual data packets is content-dependent and thus variable. Within communication cycle m+1 (57), the data transfer 47 of the forwarded data with stamp 42 now takes place from data network level 61 to control unit level 60, for example to the control unit 8 which performs the data processing 48. The control unit 8 evaluates both the stamp 42 and the content of the data transmitted. On the basis of this, the control unit 8 calculates response data and, based on the content of the stamp 42, the required time for the future output of the response data to the corresponding device to be controlled, at the output, for example, of the decentralized input/output module 2, and the type of output event, for example positive or negative switching edge etc., with which it is intended to switch. Before being transmitted to the decentralized input/output module 2, the calculated response data which are intended for the device to be controlled are provided with a stamp 49, which consists of the calculated time stamp referenced to the required planned time of signal output and the output switching event, by the control unit 8 so that the stamp 49 is a component of the response data during the forwarding. The part of the stamp 49 which characterizes the time stamp also consists of two parts. One part characterizes the communication cycle, for example communication cycle m+x (59) in which the decentralized input/output module 2 is to perform at its output the signal output 53 of an output event 54 to a device to be controlled, and the other part defines the output time of the signal output 53 relative to the start or to the end within this communication cycle thus determined, for example communication cycle m+x (59). The stamp 49 is designated only once for reasons of simplicity. From the control unit level 60, for example from control unit 8, the data transfer 50 of the calculated response data is affected with the stamp 49 to the data network level 61, for example at the beginning of the next communication cycle m+2 (58). This data transfer 50 also occurs synchronously to the communication clock and can be performed in any communication cycle. From the data network level 61 a data transmission 51 is effected, for example still within communication cycle m+2 (58), to the automation component level 62, for example to the decentralized input/output module 2 which evaluates the stamp 49 with which the received data are provided. Depending on the result of the evaluation of the stamp 49, especially of the part which designates the time of the output of the data, the data are temporarily stored by the decentralized input/output module 2 and the corresponding signal output 53 (for example switching of nominal values at the output of the decentralized input/output module 2, with the switching event provided in the stamp 49, to the device to be controlled, with the output event 36) is only effected at the intended time, for example in communication cycle m+x (59). The data conversion 52 of the received data into signals which can be interpreted for the device to be controlled, which was previously necessary, can be carried out at any time between the data transmission 51 in the communication cycle m+2 (58) and to signal output 53 in communication cycle m+x (59) by the decentralized input/output module 2.

Thus, the switching of an output event 54 at the output of the decentralized input/output module can be planned precisely and performed with extraordinary timing precision based on the time of registration of an entry event 40 occurring at the input of a decentralized input/output module. This is extraordinarily advantageous in the field of drive engineering in distributed automation systems, for example in the case of wood-processing machines or for switching cams etc. The time interval 55 between input event 40 and output event 54 can thus be adjusted and achieved individually with in each case the same high time accuracy for any situation in the field of application described which greatly reduces the dependence on dead times by stations affected in the communication system.

In summary, the invention relates to a synchronous, clocked communication system, for example a distributed automation system, the stations of which can be any automation components and which are coupled to one another via a data network 1. Using the disclosed method for the integration of decentralized input/output modules 2, 3, these decentralized input/output modules 2, 3 can be linked into the synchronous clocked communication system in such a manner that they can use its characteristics unrestrictedly. Thus, in particular, the detection of input signals and the output of output signals is possible in a deterministic and synchronous manner in the decentralized input/output modules 2, 3. In addition, the disclosed method enables input signals to be detected with an accuracy of less than the length of one communication cycle of the communication system and to support the switching of output signals in smaller time granularities than the length of one communication cycle which, in particular, finds use, e.g. for switching cams. In addition, the invention provides for synchronization for actual-value detections and nominal-value outputs of the most varied types of automation components such as, e.g. decentralized input/output modules 2, 3 and digital drives 4, 5, 6. All possible bus systems currently used such as, e.g. field bus, professional field bus, Ethernet, industrial Ethernet, FireWire or also bus systems internal to a PC (PCI) etc. are conceivable as the data network 1 of the communication system.

We claim:

1. A method for linking decentralized input/output modules in a synchronous clocked communication system comprising:
   communicatively coupling each of a first decentralized input/output module and a second decentralized input/output module to a means for generating a communication clock;
   communicatively coupling each of a first station associated with the first decentralized input/output module and a second station associated with the second decentralized input/output module to the means for generating a communication clock and the its associated decentralized input/output module; and
   synchronizing the at least one decentralized input/output module to the communication clock of the communication system;
   wherein at least one of the stations is selected from a control unit and a device to be controlled;
   wherein the signals of a device to be controlled are registered and detected at a desired time at the input of the decentralized input/output module and the time is adjusted at the input of the module with respect to the communication clock of the communication system or a clock derived therefrom; and wherein the registration and detection of signals at the input of each of the decentralized input/output modules are synchronized in such a manner that the registration and detection takes place at the same time with respect to the communication clock of the communication system at the respective decentralized input/output modules.

2. The method according to claim 1, further comprising detecting synchronously with the communication clock, signals of the device to be controlled which are present at the input of the decentralized input/output module of the device, converting said signal into a data format compatible with the data network and forwarding the data synchronously to the control unit via the data network for processing.

3. The method according to claim 1, further comprising transmitting data transmitted synchronously to the decentralized input/output module from the control unit via the data network, said data being converted in the input/output module into signals which can be interpreted by the device to be controlled and switched at the output of the decentralized input/output module synchronously with respect to the communication clock of the communication system, and forwarding said signals to the device.

4. The method according to claim 1 wherein switching and forwarding signals at the output of the decentralized input/output module to the device to be controlled can be time-adjusted with respect to the communication clock of the communication system or a clock derived therefrom.

5. The method according to claim 4, wherein output of signals at the output of the decentralized input/output modules of at least two devices to be controlled which are in each case connected to a different decentralized input/output module is synchronized in such a manner that the output takes place at the same time with respect to the communication clock of the communication system at the respective decentralized input/output modules.

6. The method according to claim 1, wherein the registration and detection of signals at the input of at least one decentralized input/output module and of at least one other automation component communicatively coupled to the at least one module is synchronized in such a manner that the registration and detection take place at the same time with respect to the communication clock of the communication system at the decentralized input/output module and the automation component.

7. The method according to claim 4, wherein the output of signals at the output of at least one decentralized input/output module and of at least one other automation component communicatively coupled to the at least one module is synchronized in such a manner that the signal output takes place at the same time with respect to the communication clock of the communication system at the decentralized input/output module and the automation component.

8. The method according to claim 1, wherein each device to be controlled, signals are detected at least once by the associated decentralized input/output modules converted into a data format compatible with the data network and forwarded synchronously with respect to the communication clock of the communication system via the data network to the control unit for processing within one communication cycle of the communication system.

9. The method according to claim 8, wherein the detection of signals at a device to be controlled takes place at such a time within a communication cycle of the communication system that a conversion of the signals into a data format compatible with the data network and a forwarding of the data to the control unit via the data network for processing is effected by the decentralized input/output module in an immediately following communication cycle and a conversion of response data of the control unit in the decentralized input/output module into signals which can be interpreted for the device to be controlled, and output for the response data to the device to be controlled, is effected in the next communication cycle so that there is an interval between signal detection at the device to be controlled and output of the response signal to the device to be controlled, said internal is, at the most, two communication cycles of the communication system.

10. The method according to claim 1, wherein the decentralized input/output module provides characteristic data which can be called up and evaluated via the data network by at least one control unit, the characteristic data comprising the maximum possible accuracy and the minimum possible time in the temporal detection of signals from a device to be controlled.

11. The method according to claim 1, wherein the decentralized input/output module provides characteristic data which can be called up and evaluated by at least one control unit via the data network, the characteristic data comprising the maximum possible accuracy and the minimum possible time in the temporal output of signals to a device to be controlled.

12. The method according to claim 1, wherein at least one of the stations of the communication system has a counter and the number of the communication cycles is continuously counted from the system start-up beginning.

13. The method according to claim 12, wherein the counter is incremented at the beginning of a new communication cycle.

14. The method according to claim 12, wherein the counter reflects the current communication cycle.

15. The method according to claim 12, wherein the communication cycle is arbitrarily derived and/or calculated from a number.

16. The method according to claim 12, wherein the communication cycle is represented by a digitized number or an absolute time unit which is derived from the duration of a communication cycle.

17. The method according to claim 12, wherein a time stamp is generated from a communication cycle which is represented as a digitized number or in an absolute time unit which is derived from the duration of a communication cycle, and/or from a time value within a communication cycle.

18. The method according to claim 17, wherein the time stamp comprises two parts, one part determines the communication cycle of the communication system, and the other part determines the time relative to the start or to the end of a communication cycle of the communication system.

19. The method according to claim 17, wherein the station with the counter distributes data selected from the current count, current communication cycle and current time stamp to at least one further station of the communication system by means of the data network.

20. The method according to claim 19, wherein the current count is distributed by the station with the counter to at least one further station of the communication system by means of the data network and the current communication cycle and/or current time stamp is determined by at least one further station from the transmitted current count.

21. The method according to claim 1, wherein signals of a device to be controlled, when they are registered and detected at the input of a decentralized input/output module are provided by the input/output module with a time stamp and a detection switching event which is converted into a data format compatible with the data network (1), and together with the time stamp is forwarded via the data network to the control unit for evaluation and processing.

22. The method according to claim 1, wherein data which are intended for the device to be controlled, before they are transmitted to the decentralized input/output module, are provided with a time stamp referenced to the time of a planned signal output and with an output switching event by the control unit and are transmitted with this time stamp and the switching event via the data network to the decentralized input/output module.

23. The method according to claim 22, wherein data which are provided with a time stamp which relates to the planned signal output and with an output switching event and are intended for the device to be controlled are converted into signals which can be interpreted for the device to be controlled by the decentralized input/output module and are switched at the time which is predetemiined by the transmitted time stamp at the output of the decentralized input/output module in accordance with the switching event and output to the device to be controlled.

24. A synchronous clocked communication system having characteristics of equidistant communication cycles comprising: a means for generating a communication clock, a first station and a second station, each communicatively coupled to the means for generating a communication clock, at least one data network communicatively coupled to the means for generating a communication clock and the two stations and each of a first decentralized input/output module associated with the first station and a second decentralized input/output module associated with the second station communicatively coupled to the means for generating a communication clock, the two stations and the at least one data network, wherein the communication system is operable to link the decentralized input/output modules to at least one other element of the synchronous clocked communication system; wherein the communication system has at least one time adjusting device for adjustment of time for registration and detection of signals of a device to be controlled at the input of an input/output module with respect to the communication clock of the communication system or a clock derived therefrom; and wherein the communication system is operable to synchronize the registration and detection of signals at the input of the decentralized input/output modules of at least two devices to be controlled which are in each case connected to a different decentralized input/output module, in such a manner that the registration and detection takes place at the same time with respect to the communication clock of the communication system at the respective decentralized input/output modules.

25. The communication system according to claim 24, wherein at least one decentralized input/output module detects signals of the device to be controlled which are present at the input of the decentralized input/output module synchronously with respect to the communication clock of the communication system and converts them into a data format compatible with the data network and forwards them synchronously to the control unit via the data network for processing.

26. The communication system according to claim 24, wherein at least one decentralized input/output module converts data sent synchronously by the control unit via the data network into signals which can be interpreted for a device to be controlled and switches them at the output of the decentralized input/output module synchronously with respect to the communication clock of the communication system and forwards them to the device.

27. The communication system according to claim 24, wherein the communication system has at least one time adjusting device which adjusts the time for the switching and forwarding signals at the output of the decentralized input/output module to the device to be controlled, with respect to the communication clock of the communication system or a clock derived therefrom.

28. The communication system according to claim 24, wherein the communication system synchronizes the output of signals at the output of the decentralized input/output modules to at least two devices to be controlled which are in each case connected to a different decentralized input/output module, in such a manner that the output takes place at the same time with respect to the communication clock of the communication system at the respective decentralized input/output modules.

29. The communication system according to claim 24, wherein the communication system synchronizes the registration and detection of signals at the input of at least one decentralized input/output module and of at least one other automation component communicatively coupled to the at least one module in such a manner that the registration and detection takes place at the same time with respect to the communication clock of the communication system at the decentralized input/output module and the automation component.

30. The communication system according to claim 26, wherein the communication system synchronizes the output of signals at the output of at least one decentralized input/output module and of at least one other automation component communicatively coupled to the at least one module in such a manner that the signal output takes place at the same time with respect to the communication clock of the communication system at the decentralized input/output module and the automation component.

31. The communication system according to claim 30, wherein the communication system has at least one decentralized input/output module which, for each associated device to be controlled, detects the signals at least once within a communication cycle of the communication system, converts these signals into a data format compatible with the data network and forwards them synchronously with respect to the communication clock of the communication system via the data network to the control unit for processing.

32. The communication system according to claim 31, wherein the communication system ensures that the detection of signals at a device to be controlled takes place at such a time within a communication cycle of the communication system that a conversion of the signals into a data format compatible with the data network and a forwarding of the data to the control unit via the data network for processing is effected by the decentralized input/output module in the inunediately following communication cycle, and a conversion of the response data of the control unit in the decentralized input/output module into signals which can be interpreted for the device to be controlled, and their output to the device to be controlled, is effected in the next communication cycle so that the interval between signal detection at the device to be controlled and output of the response signal to the device to be controlled is, at the most, two communication cycles of the communication system.

33. The communication system according to claim 24, wherein the communication system has at least one decentralized input/output module which provides characteristic data which can be called up and evaluated via the data network by at least one control unit, the characteristic data comprising the maximum possible accuracy and the minimum possible time in the temporal detection of signals from a device to be controlled.

34. The communication system according to claim 24, wherein the communication system has at least one decentralized input/output module which provides characteristic data which can be called up and evaluated by at least one control unit via the data network, the characteristic data comprising the maximum possible accuracy and the minimum possible time in the output with time of signals to a device to be controlled.

35. The communication system according the claim 24, wherein at least one station has a counter which continuously counts the number of communication cycles from system start-up beginning.

36. The communication system according to claim 35, wherein the counter is incremented at the beginning of a new communication cycle.

37. The communication system according to claim 35, wherein the communication system ensures that the current state of the counter reflects the current communication cycle.

38. The communication system according to claim 35, wherein the communication system arbitrarily derives and/or calculates an arbitrary communication cycle from a number.

39. The communication system according to claim 35, wherein the communication system represents a communication cycle by means of a digitized number or an absolute time unit which is derived from the duration of a communication cycle.

40. The communication system according to claim 35, the communication system has a time stamp generated from a communication cycle, which stamp is represented as a digitized number or in an absolute time unit which is derived from the duration of a communication cycle and/or from a time value within a communication cycle.

41. The communication system according to claim 40, wherein the time stamp comprises of two parts, one part determines the communication cycle of the communication system, and the other part determines the time relative to the start or to the end of a communication cycle of the communication system.

42. The communication system according to claim 35, wherein the station with the counter distributes current count, current communication cycle, and/or current time stamp to at least one further station of the communication system by means of the data network.

43. The communication system according to claim 42, wherein the counter distributes the current count to at least one further station of the communication system by means of the data network and the further station determines the current communication cycle and/or the current time stamp from the transmitted current count.

\* \* \* \* \*

UNITED STATES PATENT AND TRADEMARK OFFICE
CERTIFICATE OF CORRECTION

| | |
|---|---|
| PATENT NO. | : 7,280,565 B2 |
| APPLICATION NO. | : 09/950171 |
| DATED | : October 9, 2007 |
| INVENTOR(S) | : Michael Franke et al. |

It is certified that error appears in the above-identified patent and that said Letters Patent is hereby corrected as shown below:

On the Title Page, Item (22) Filed:, please delete "Feb. 12, 2002," and replace with --Sep. 10, 2001--.

Signed and Sealed this

Eighth Day of April, 2008

JON W. DUDAS
*Director of the United States Patent and Trademark Office*